March 21, 1961     F. E. FINLAYSON ET AL     2,976,388
THERMOSTAT CONTROL
Filed May 27, 1957     2 Sheets-Sheet 1
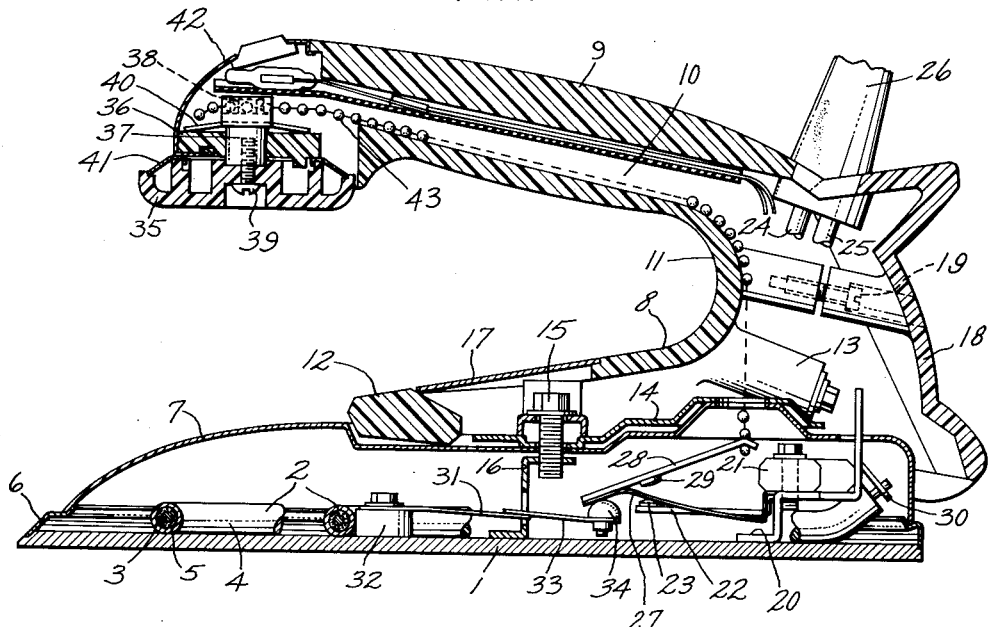
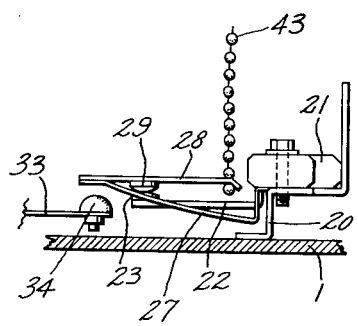
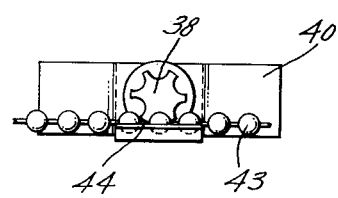
Inventors:
Frank E. Finlayson
Alfred G. Swenson
by Lawrence R. Kempton
Their Attorney March 21, 1961    F. E. FINLAYSON ET AL    2,976,388
THERMOSTAT CONTROL
Filed May 27, 1957    2 Sheets-Sheet 2

Inventors:
Frank E. Finlayson
Alfred G. Swenson
by Laurence R. Kempton
His Attorney

United States Patent Office 2,976,388
Patented Mar. 21, 1961

2,976,388

THERMOSTAT CONTROL

Frank E. Finlayson and Alfred G. Swenson, Ontario, Calif., assignors to General Electric Company, a corporation of New York Filed May 27, 1957, Ser. No. 661,954

3 Claims. (Cl. 219—25)

This invention relates to electrically heated flatirons, and more particularly to a temperature adjustment and control means therefor.

An object of this invention is to provide an open-handled flatiron with a temperature adjustment knob located at the forward portion of the handle grip for adjustment of a thermally operable switch within the body of the iron.

Another object of this invention is to provide temperature control mechanism for an iron with a remotely located heat selection knob and improved means for transmitting motion from the adjustment knob to the thermally actuated switch. A further object of this invention is to provide a thermally actuated switch for a flatiron with simplified means for manual adjustment of the switch actuating characteristics, which mechanism provides reduced manufacturing cost and high reliability.

Still another object of this invention is to provide a temperature adjustment and control mechanism for a flatiron, facilitating factory calibration after complete assembly of the iron.

In accordance with one aspect of this invention, an open-handled flatiron is provided with a temperature adjustment knob at the forward portion of the handle grip. Rotation of this knob is translated into linear motion of a member movably positioned in a hollow passageway extending through the handle grip. This linear motion is transmitted to the movable resilient arm of a switch in the body of the iron through the hollow rear handle support, thereby to adjust the switch with respect to a thermally responsive member mounted on the soleplate of the iron. Switch actuation thus depends on the adjustment of the manual knob and the temperature of the soleplate, the soleplate heating element being under control of this switch.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

Fig. 1 is a sectional elevation of a flatiron embodying a preferred form of our invention;

Fig. 2 is a partial view of the iron shown by Fig. 1 with components in a different adjusted position;

Fig. 3 is a plan view of a detail of the iron shown by Fig. 1;

Figure 4:
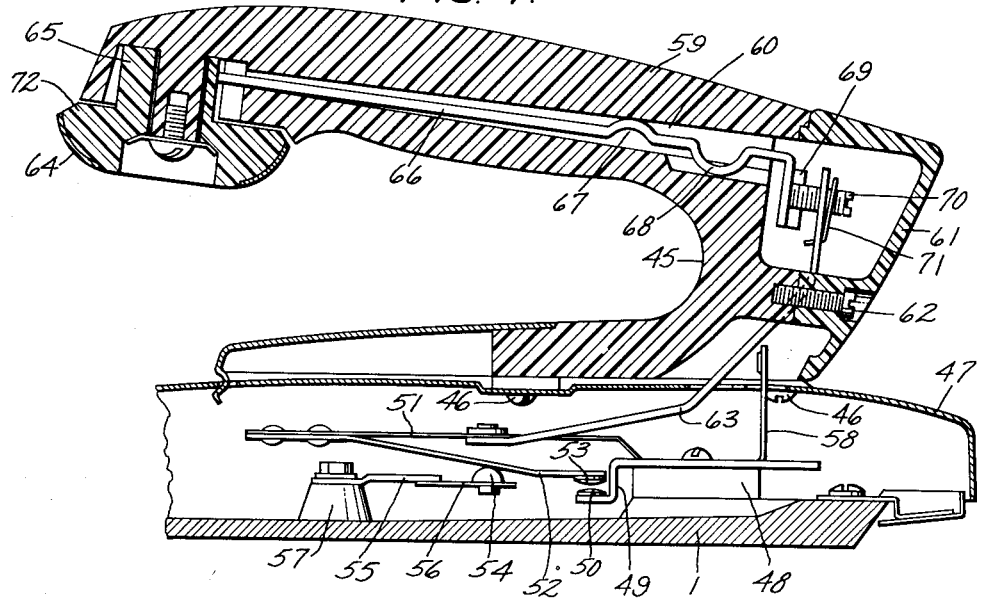
Fig. 4 is a partial sectional elevation of a flatiron embodying a modified form of our invention.

Referring to Fig. 1 of the drawings, we have shown a flatiron including typically a soleplate 1 adapted to be heated by one or more electrical heating elements 2. As illustrated, each heating element may comprise an electrical resistance element 3 centrally located within an outer tubular sheath 4, the heating element being insulated from the sheath by a mass 5 of electrical insulating and heat resistant material, such as granulated magnesium oxide. Soleplate 1 may be fabricated from steel, for example, in which case heating elements 2 are secured in intimate heat exchange relationship with the soleplate by means such as brazing with copper or similar material, providing good heat conductivity between the heating element and the soleplate. When the heating elements are brazed in position on the upper surface of soleplate 1, it may be desirable to braze into position at the same time a soleplate edge cap 6 in the form shown generally by Fig. 1.

To protect the operator of the iron from accidental contact with the electrical heating elements, or other electrical elements included within the body of the iron, we provide a cover 7 extending over substantially the entire soleplate and mating with edge plate 6 thereof. Thus, cover 7 and soleplate 1 define the body of the iron with sufficient internal volume to house the electrical components necessary for operation and automatic control of the flatiron. Also secured to the soleplate is an operating handle 8, molded or otherwise formed of electrical insulating material having heat resistant and heat insulation characteristics. As shown in Fig. 1, handle 8 includes a grip portion 9 having an internal passageway 10 and a hollow rear handle support 11 merging into a saddle portion 12. Internally of the rear handle support, saddle portion 12 may include bosses 13 to which are secured an attaching bracket 14 for the handle. A suitable fastening device 15 engages bracket 14 with a Z-shaped arm 16 welded or otherwise secured to the upper surface of soleplate 1. With the construction as shown by Fig. 1, securement of the handle to the soleplate through bracket 16 also secures cover 7 to the soleplate. To conceal fastening device 15, a metallic or other suitable saddle plate 17 may be snapped into position on the handle saddle portion in a conventional manner. A removable cover plate 18 forms part of a rear handle support, this cover plate being secured in assembled relationship with the main portion of the handle in any suitable manner, such as by screws 19, the heads of which preferably are recessed in the manner shown.

Within the body of the iron is a thermally actuated electrical switch for control of the electrical heating element. In the form shown in Fig. 1, the switch itself is mounted on the soleplate through a bracket 20 secured to the soleplate, bracket 20 in turn carrying an electrical insulator assembly 21. Carried by insulator 21 is a substantially rigid arm 22 carrying a fixed contact 23 of the switch. Typically, rigid arm 22 would be connected to one side of the electrical supply line, for example, through one of the conductors 24 or 25 entering the rear portion of the iron through a strain relief device 26. Also secured to insulator 21, and insulated from rigid arm 22, is a resilient arm 27. Resilient arm 27 is welded or otherwise secured adjacent the outer end thereof to a substantially rigid contact carrying arm 28, having a movable contact 29 secured thereto for cooperative operation with fixed contact 23, thus to define the two contacts of the switch. In a manner well understood, resilient arm 27 is electrically connected to one terminal, such as 30, of the electrical heating element, the other terminal of the electrical heating element being connected in any suitable fashion to the other conductor of the electrical supply line. Thus, when switch contacts 23 and 29 are engaged, electrical current may flow through the electrical heating element, thus to heat the soleplate.

Temperature responsive actuation of the switch assembly is accomplished by a thermally responsive member, for example, in the form of a bimetallic element 31 secured to a boss 32 on the soleplate. In a manner well known in the art, bimetallic element 31 may be made up of two metals having different coefficients of expansion, the metal having the higher expansion rate being on the underside, whereby upon increase in temperature bimetallic element 31 bows upwardly, thereby tending to open the circuit through contacts 23 and 29. At the outer end of bimetallic element 31 is a secondary bimetallic element 33 having reverse characteristics responsive to temperature to prevent overshoot of a desired temperature upon the first few cycles of switch operation. Use of such a secondary bimetallic element is also a well known expedient in the flatiron art. Fastened to the outer end of secondary bimetal 33 in any suitable manner is an insulating button 34 engageable with the free or movable outer end of resilient arm 27. Components of the switch assembly, specifically including resilient arm 27 and arm 28, are electrically energized when the switch is closed; therefore, it is essential that button 34 be an electrical insulator to prevent transmission of the electrical voltage to exposed metallic portions of the iron. It will be understood that resilient arm 27 is biased to move arm 28 and contact 29 downwardly toward engaged position with contact 23.

Flatirons are, of course, used for ironing many different types of fabrics requiring different operating temperatures. For examples, synthetic fabrics, such as nylon or rayon, require relatively low ironing temperatures to prevent damage to the fabric; while other fabrics, such as linen or cotton, require relatively high ironing temperatures for satisfactory smoothing results. Therefore, it is desirable and necessary for practical operation that the iron be provided with suitable manually adjustable means for selection of operating characteristics of the thermally responsive switch. In accordance with this invention, we provide a rotatably adjustable member 35, for example, in the form of a knob, at the outer portion of the handle grip, thus providing convenient operator adjustment at any time during operation of the iron. As shown in Fig. 1, the outer end of the handle is formed to include a bearing member 36 provided with a bore to receive a shaft 37 associated with a sprocket wheel 38. Knob 35 is secured to shaft 37 and sprocket 38, for example, by means of a screw 39. As shown, a friction plate 40 may be interposed between sprocket 38 and bearing portion 36 of the handle, thus to retain knob 35 in adjusted rotary position. Preferably knob 35 is provided on its upper surface adjacent the outer edge thereof with a calibrated dial 41 used in conjunction with a fixed index inscribed in a suitable manner on a front escutcheon 42 of the handle.

In accordance with this invention, we provide motion translation means for converting the rotary motion of knob 35 into suitable linear motion for adjustment of the flexible or resilient arm of the switch. In accordance with the preferred embodiment of Fig. 1, flexible motion transmission means, for example, in the form of a bead chain 43, engages sprocket 38. While we have shown a bead chain and sprocket, it is to be understood that other equivalent forms comprising a flexible member engageable with a rotary portion of the control knob may be adapted for this same purpose. A sprocket and bead chain may be preferred, however, in view of the low manufacturing cost, and the positive connection afforded by the sprocket with respect to the chain. As shown clearly by Fig. 1, bead chain 43 extends through internal passageway 10 of the handle grip, and downwardly through the rear handle support for connection to the outer or free end of the rigid arm 28 of the switch assembly. As shown by Fig. 3, bead chain 43 may be confined between sprocket 38 and a barrier 44, thus providing a positive non-slip connection.

With components adjusted to the position shown by Fig. 1, switch contacts 23 and 29 are separated, and hence the iron is in its off position, regardless of any motion of the thermally responsive member 31-33. In other words, switch arm 28 is held by bead chain 43 in an elevated position. By rotation of knob 35 to the desired temperature setting, the bead chain is allowed to move a predetermined amount, thus to lower the free or movable end of contact arm 28, for example, to the position shown by Fig. 2. As shown, contacts 23 and 29 are engaged to complete an electrical circuit to the heating element, thus causing the soleplate to be heated. As the soleplate temperature rises, the outer end of the thermally responsive member, in particular insulator 34, rises to engage the free end of resilient arm 27. Upon sufficient movement of insulator 34 upwardly in this fashion, the electrical circuit will be opened at contacts 29 and 33. The subsequent cycling between open and closed position of these switch contacts maintains soleplate temperature within the selected range. If at any time a different operating temperature is desired, it is necessary merely to adjust the rotary position of the manually adjustable member, which rotation is translated into linear motion of the flexible motion transmitting member, thus to adjust the position of the thermally actuated switch with respect to the thermal actuator itself.

In manufacture of an iron in accordance with the embodiment of Figs. 1 through 3, the soleplate is assembled with the thermally responsive member and the switch assembly mounted in position. The handle is assembled with the rotatable adjustment member and the flexible motion transmitting member in position. With the handle secured to the soleplate, rear cover 18 of the rear handle support may be removed to provide access to the connection between the motion transmitting chain 43 and switch arm 28. The chain may then be connected to switch arm 28; and rough calibration may be accomplished at that time, by selection of the proper point of connection between the chain and the switch arm. Thereafter, final calibration adjustment can be accomplished by slight relative rotation between sprocket 38 and knob 35. This adjustment may, of course, be secured by tightening screw 39. Thereafter, rear cover 18 is again secured in position, and the iron is ready for operation.

Referring now to Fig. 4, we have shown an alternate form of our invention. It will be understood that in this form also soleplate 1 is electrically heated, although details of the heating elements have not been shown. Similarly, a handle 45 of slightly modified construction is shown as secured by fastening devices 46 to a cover 47, which cover may be fastened to the soleplate by any suitable means, not shown.

Cover 47 in conjunction with soleplate 1 again define the body of the iron within which may be confined not only the electrical heating elements in the manner previously described, but also the electrical switch mechanism and the thermal actuator therefor. In accordance with this embodiment, an electrical insulator 48 is secured to the soleplate, this insulator carrying a substantially rigid contact arm 49 upon which is mounted a fixed contact 50. Also secured to insulator 48, although insulated from rigid arm 49, is a flexible or resilient arm 51. Riveted or otherwise secured to the outer free end of resilient arm 51 is an arm 52 carrying a movable contact 53 on the outer end thereof. The movable contact arm is adapted to be actuated by an insulating button 54 secured to the outer end of the thermally responsive member made up of a primary bimetallic element 55 and a secondary element 56. The thermally responsive member is secured in heat exchange relationship with the soleplate, for example, by its mounting on a boss 57 in the general manner as shown. Thus, heat responsive motion of insulating button 54 tends to move arm 52, and hence the movable contact with respect to fixed contact 50.

It will be understood, of course, that one of the electrical supply lines will be connected, for example, at terminal 58 to fixed contact 50 through its supporting arm. When contacts 50 and 53 are closed, the circuit is completed to one terminal of the electrical heating element through this switch assembly, with the other terminal of the electrical heating element connected to the other side of the electrical supply line.

As in the previously described embodiment, a handle grip portion 59 includes an internal passageway 60, and similarly, the rear handle support portion is hollow and is provided with a removable rear cover plate 61 secured to the main portion of the handle by a fastening device 62. Riveted, or otherwise appropriately secured to resilient arm 51, is a substantially rigid arm 63 extending upwardly within the rear handle support. This elongated and angular arm 63 is so arranged with respect to the resilient arm to which it is secured, that lateral movement of the upper end of the motion transmitting arm 63 produces a substantial vertical component of motion of the resilient arm, and hence of movable contact arm 52 and contact 53.

Rotatably secured adjacent the outer end of the handle grip is a temperature adjustment member, again shown in the form of a rotary knob 64, although obviously other forms such as a lever or the like may be used in lieu of a knob; it being provided, in any event, that the temperature selection member will be rotary with respect to a given axis defined by a bearing portion on the handle. In accordance with this embodiment, the upper portion of knob 64 defines a cam surface 65. This cam surface is cooperatively associated with a motion transmitting member in the form of a push rod 66 extending from the cam through the internal passageway 60 in the handle grip to the rear handle support in the vicinity of the upper end of motion transmitting arm 63. As shown, push rod 66 may be provided with one or more bowed portions such as 67 and 68 to engage the inside walls of the internal passageway in the handle grip. This locates the push rod within passageway 60 to guide accurately its longitudinal movement.

The connection between push rod 66 and motion transmitting member 63 may provide a convenient calibration adjustment. As shown, the outer end of the push rod forms a bearing surface 69 for a calibration screw 70 having threaded engagement with motion transmitting arm 63. If desired, a locking spring 71 may be added to prevent accidental rotation of the calibration screw, for example, when the iron is subjected to vibrations.

In assembly of an iron in accordance with the embodiment of Fig. 4, the soleplate, switch assembly, and thermally responsive member may be mounted in proper position. Handle 45 is assembled with knob 64 and its push rod 66 in position. The handle, of course, is secured to cover 47 as previously described, and thereafter cover and handle both are secured to the soleplate. With rear cover 61 removed, ready access is provided to calibration screw 70, which may be then adjusted to provide proper correlation between the temperature responsive switch and the rotary position of knob 64.

In operation, the embodiment of Fig. 4 is similar to the previously described embodiment. Switch 64 is rotated to the proper position, for example, as provided by a scale on surface 72 of the knob in cooperation with an index mark inscribed on the handle. This adjustment of the rotary knob through push rod 66 operates the motion transmitting arm 63 to raise or lower resilient arm 51. Since movable contact 53 is carried on the resilient arm, the position of contact 53 is simultaneously adjusted. Furthermore, as can be readily seen from Fig. 4, vertical adjustment of contact arm 52 varies the position of the switch assembly with respect to the thermally responsive member, thereby to adjust or select the desired temperature operating range for the iron.

Figure 5:
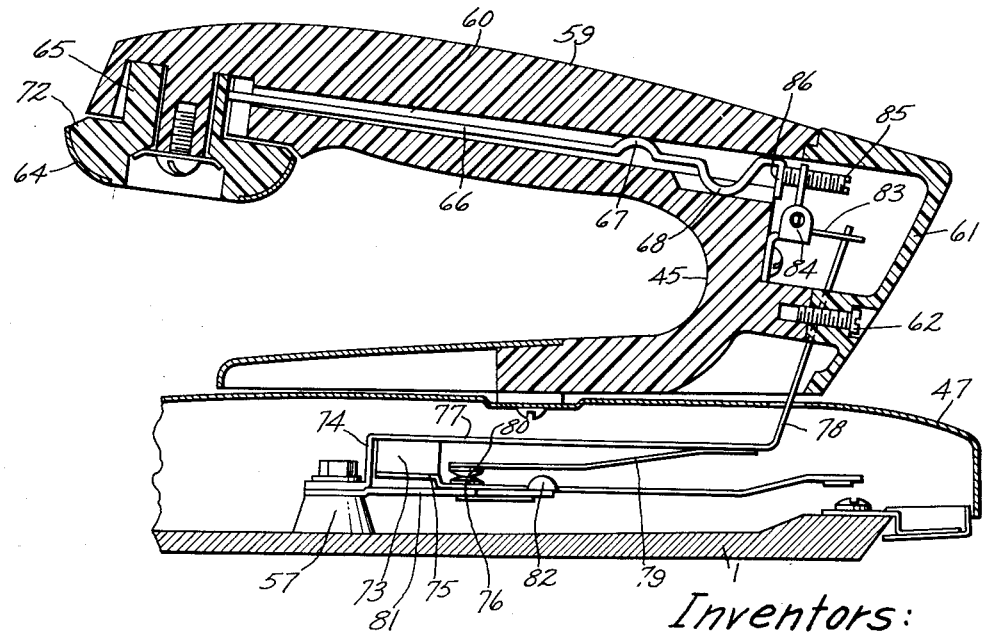
Fig. 5 is a partial sectional elevation illustrating a further embodiment of our invention.

In Fig. 5, a further modified form of our invention is illustrated, although many of the components are similar to the embodiment of Fig. 4. To the extent that these elements correspond to the embodiment of Fig. 4, identical reference numerals have been assigned.

The primary difference between the embodiment of Fig. 5 and that of the previously described arrangement shown by Fig. 4, lies in the arrangement for converting the longitudinal movement of push rod 66 in its substantially horizontal plane to the necessary vertical movement desired for the resilient arm of the movable contact.

Referring specifically to the Fig. 5 arrangement, the switch assembly is mounted on an electrical insulating block 73, which insulating block in turn is secured to the soleplate through a bracket 74. A substantially rigid arm 75 secured in any appropriate manner to the insulator carries a fixed contact 76. Also secured to insulator 73 and insulated from arm 75 is a resilient arm 77, which arm likewise is insulated from the soleplate. Arm 77 extends away from the insulator, in this instance rearwardly, and its outer end includes a portion 78 angled upwardly into the rear handle support. From a movable portion of resilient arm 77, a resilient arm 79 is welded or otherwise secured for carrying a movable contact 80 in cooperative relationship with fixed contact 76. Also mounted on soleplate boss 57 is the thermally responsive member 81, again provided with an insulating button 82 adjacent the outer end thereof for cooperative engagement with arm 79 of the movable contact. Thus, as the temperature responsive member provides upward movement of insulating button 82 responsive to increasing temperature, contacts 80 and 76 may be separated to open the circuit to the electrical heating elements (not shown).

Motion transmission between push rod 66 and resilient arm 78 is provided in this embodiment of Fig. 5 through a bell crank 83, pivotally mounted on a bracket 84 secured within a recess in the rear handle support. One arm of bell crank 83 includes a suitable pivotal connection with the upper arm 78 of the switch assembly; while the other arm of the bell crank provides threaded engagement with a calibration screw 85. This calibration screw 85 engages a bearing plate 86 on the end of the push rod. Since in accordance with this embodiment spring arm 77 is biased to bow upwardly, the calibration screw is held in engagement with bearing plate 86 on the push rod. The push rod again is adjusted as to its longitudinal position within recess 60 of the handle grip by rotation of knob 64 and the associated cam 65 as previously described. In assembly of this form of the iron, the handle and soleplate components may be preassembled, and all of the components may then be secured together, after which calibration is accomplished by rotation of screw 85 on the bell crank. Thereafter, the rear cover plate 61 may be secured in position. In operation, this iron is generally similar to the previously described embodiments, in that rotation of knob 64 controls the longitudinal position of the push rod, and hence controls the vertical position of resilient arm 77. Since the movable contact is carried by arm 77, its position likewise is adjusted with respect to the thermally responsive member.

While the present invention has been described by reference to the particular embodiments thereof, it is to be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. In a flatiron, a soleplate assembly including an electrical heating element, a handle secured to said soleplate, said handle having a hollow rear handle support and a grip portion with an internal passageway, a fixed contact carried by said soleplate, a resilient arm carrying a movable contact for operation in conjunction with said fixed contact as a switch, a temperature responsive member secured to said soleplate and adapted to impart switch actuating motion to said resilient arm, a manually rotatable element at the forward portion of said handle grip portion, a flexible motion transmitting member extending through said internal passageway and rear handle support for connection to said resilient arm, and a driving connection from said manually rotatable element to said motion transmitting member, whereby manual adjustment of said rotatable element adjusts the temperature setting at which said switch operates.

2. In a flatiron, a soleplate assembly including an electrical heating element, a handle secured to said soleplate, said handle having a hollow rear handle support and a grip portion with an internal passageway, a switch assembly carried by said soleplate and including a fixed contact and a resilient arm carrying a cooperating movable contact, a temperature responsive member secured to said soleplate and adapted to impart switch actuating motion to said resilient arm, a rotatably adjustable knob at the forward portion of said handle grip portion, a bead chain motion transmission connection extending from said rotatable knob through said internal passageway and said rear handle support for adjusting the relative position of said switch with respect to said temperature responsive member, and sprocket means rotatable with said knob for converting rotation thereof into linear motion of said bead chain, thereby to permit operator selection of the temperature operating range of the iron.

3. In a flatiron, a soleplate assembly including an electrical heating element, a handle including a grip portion and a handle support provided with an internal passageway therein and secured to said soleplate assembly, a first switch contact carried by said soleplate, a resilient arm carrying a movable contact for operation in conjunction with said first contact as a switch for said heating element, a temperature responsive member secured to said soleplate assembly for imparting switch actuating motion to one of said contacts, a manually rotatable member mounted forwardly on said handle with respect to the grip portion thereof, a flexible motion transmitting member extending through said internal passageway for connection to said resilient arm, and a driving connection from said manually rotatable member to said motion transmitting member, whereby manual adjustment of said manually rotatable member adjusts the temperature setting at which said switch operates.

References Cited in the file of this patent

UNITED STATES PATENTS

| | | |
|---|---|---|
| 1,971,970 | Walder | Aug. 28, 1934 |
| 2,277,034 | Bisley | Mar. 24, 1942 |
| 2,277,439 | Jepson | Mar. 24, 1942 |
| 2,723,336 | Swenson et al. | Nov. 8, 1955 |
| 2,871,587 | Jepson | Feb. 3, 1959 |

FOREIGN PATENTS

| | | |
|---|---|---|
| 160,617 | Austria | Aug. 11, 1941 |